C. W. SCHULTZ & E. A. SWEENEY.
SEAT BACK SPRING.
APPLICATION FILED MAR. 30, 1911.
999,678. Patented Aug. 1, 1911.
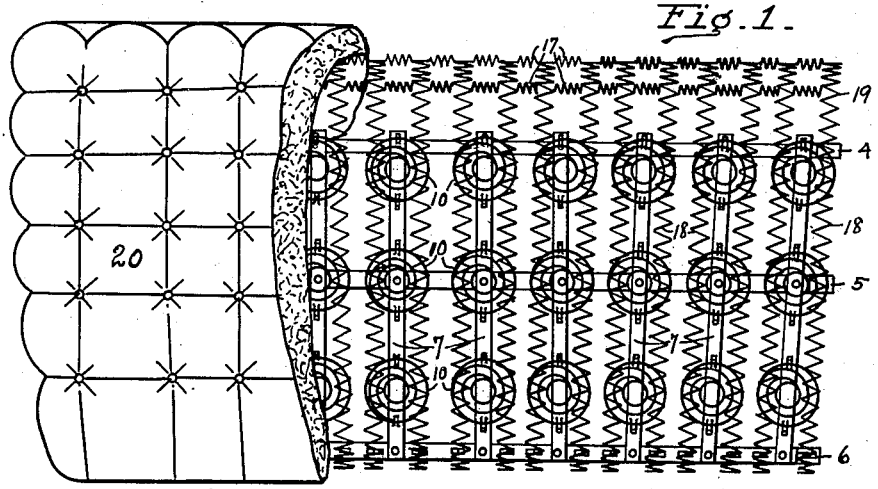
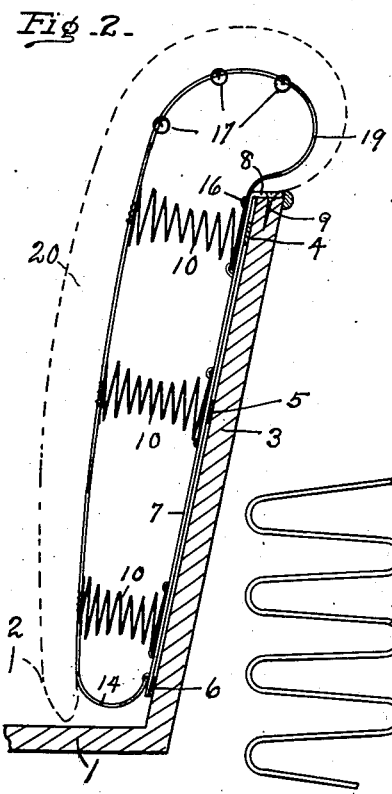
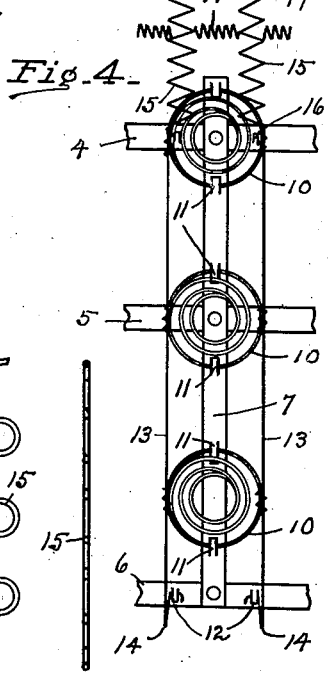
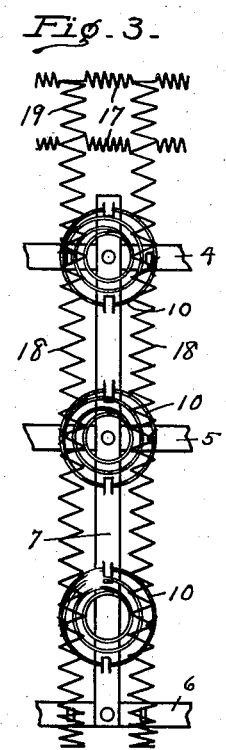
WITNESSES:
INVENTORS
C. W. Schultz & E. A. Sweeney
BY
Edward N. Pagelsen,
ATTORNEY

UNITED STATES PATENT OFFICE.

CHARLES W. SCHULTZ AND EDWARD A. SWEENEY, OF DETROIT, MICHIGAN.

SEAT-BACK SPRING.

999,678.  Specification of Letters Patent.  Patented Aug. 1, 1911.

Application filed March 30, 1911. Serial No. 617,804.

*To all whom it may concern:*

Be it known that we, CHARLES W. SCHULTZ and EDWARD A. SWEENEY, citizens of the United States, residing at Detroit, in the county of Wayne and State of Michigan, have invented a new and Improved Seat-Back Spring, of which the following is a specification.

This invention relates to seat-back springs for vehicles, especially for automobile tonneaus, and the object of this construction is to provide means whereby particularly the upper part of the seat-back shall be rendered soft and resilient.

In the accompanying drawings Figure 1 is a front elevation of the set of springs for an automobile tonneau seat-back with a portion of the same covered by upholstery. Fig. 2 is a vertical cross section of the same. Figs. 3 and 4 are elevations of sections of two forms of the construction, on a larger scale. Fig. 5 is a front elevation and Fig. 6 is an edge view of the resilient ribbon of spring wire employed in this construction.

Similar reference characters refer to like parts throughout the several views.

The back cushion of an automobile tonneau is usually formed by building up a thick pad of horse-hair, moss or other somewhat resilient fibrous material, covering the same with leather, plush or other good wearing material, and then tufting. Such cushions are yielding to a certain extent but not sufficiently so to be perfectly comfortable when the vehicle is traveling at high speeds over poor roads. It has been found most desirable that especially those portions of the cushions of automobiles, immediately back of the neck, shoulders and upper part of the chest of the passengers, should be yielding and soft and at the same time resilient, and that this is more desirable than that the seat-cushions should be resilient.

In the accompanying drawings 1 conventionally represents the seat, 2 the seat cushion, and 3 the back of an automobile seat, which back may be of any desired height and inclination. The spring construction is first assembled and then secured in position to the back. It consists of a frame formed of horizontal bars 4, 5 and 6, and upright bars 7 which position the horizontal bars and are secured thereto. The upper ends 8 of these horizontal bars may be bent to engage the top of the seat-back 3 where they may be secured in position by the screws 9, as shown in Fig. 2.

Secured to the upright bars 7 are a series of forwardly projecting coil springs 10. These may be of any construction and are preferably secured to the vertical bars by means of tongues 11 sheared out of these bars, under which the rear-end spirals of the springs may extend, after which the tongues may be bent back to hold the coils in place. Extending from the bars 6, where their ends may be journaled under the tongues 12, as shown in Fig. 4, are rods 13, forming the loops 14 and extending up in front of the coil springs 10, and connecting to the resilient ribbons 15 at their upper ends, preferably at the middle of the upper springs 10. These ribbons are normally flat and are made of resilient wire bent into sinuous curves as shown on a larger scale in Figs. 5 and 6. These spring ribbons are bent into the form of a loop as shown in Fig. 2 and extend upward and backward and then forward until their ends are connected to the cross bar 4 by the loops 16. The result of this construction is a spring of which the lower portion is quite stiff while the upper portion is very yielding. The adjacent ribbons 15 may be connected across by small coil springs 17, thus forming a soft resilient cushion for the upper portion of the body and the head.

Instead of rods 13 and ribbons 15, continuous ribbons 18 may extend from the cross bars 6 up over the springs 10 and thence farther upward to form the loops 19, which may again be connected by the small coils 17. The construction is thus seen to consist in a rigid frame, coil springs mounted thereon and projecting forward, C-shaped resilient members extending over the coil springs and connecting to the upper and lower bars of the frame, the upper portions, at least, of the C-shaped members being formed of a ribbon produced by a wire bent into sinuous curves. These curves will open and close as the stretch on the ribbon varies. The upper portions of the C-shaped members preferably overhang the rear of the frame. Any sudden jolt, such as may be caused by a stone or a rut when the vehicle is traveling at high speed, is softened by the spring ribbons yielding. The small springs 17 cause adjacent springs 19 to act together. A pad 20 of any desired material and thickness may be secured over the springs, and the upper portion of the pad will be prevented from sinking in between the ribbons 15 or 19 by the small springs 17. The ribbons formed by bending spring wire into sinuous curves, are not only resilient transversely, in the manner that a flat plate is resilient, but are also elastic, shortening and lengthening as may be necessary and then returning to their original lengths. As a result, the upper portion of this seat-back spring is unusually yielding and effective.

Having now explained our construction, what we claim as our invention and desire to secure by Letters Patent is:—

A seat-back-spring construction comprising a frame formed of longitudinal and upright bars secured together, coil springs mounted on the same to project forward, and a series of upright spring ribbons formed by bending resilient wire to form flat sinuous curves, said ribbons connecting to the frame at their lower ends, extending upward over the fronts of the coil springs, and then forming loops at the top of the frame, their ends connecting to the frame, and small coil springs connecting the upper portion of the adjacent spring ribbons.

In testimony whereof we have signed this specification in the presence of two subscribing witnesses.

CHARLES W. SCHULTZ.
EDWARD A. SWEENEY.

Witnesses:
 EDWARD N. PAGELSEN,
 ELIZABETH M. BROWN.